(12) United States Patent
Tonkovich

(10) Patent No.: US 8,584,395 B2
(45) Date of Patent: Nov. 19, 2013

(54) DECOY DUCK APPARATUS

(75) Inventor: Scott Tonkovich, Imlay Township, MI (US)

(73) Assignee: Scott Tonkovich, Imlay Township, MI (US)

( * ) Notice: Subject to any disclaimer, the term of this patent is extended or adjusted under 35 U.S.C. 154(b) by 24 days.

(21) Appl. No.: 13/317,189

(22) Filed: Oct. 12, 2011

(65) Prior Publication Data
US 2013/0014423 A1  Jan. 17, 2013

Related U.S. Application Data

(60) Provisional application No. 61/455,306, filed on Oct. 19, 2010.

(51) Int. Cl.
*A01M 31/06* (2006.01)
(52) U.S. Cl.
USPC .......................................................... 43/3; 43/2
(58) Field of Classification Search
USPC ............................................................. 43/3, 2
See application file for complete search history.

(56) References Cited

U.S. PATENT DOCUMENTS

| | | | |
|---|---|---|---|
| 1,789,649 A * | 1/1931 | Gazecki et al. .......... | 43/3 |
| 1,967,902 A * | 7/1934 | Reichel ............. | 242/375.3 |
| 2,539,727 A * | 1/1951 | Clark ................... | 43/3 |
| 2,917,857 A * | 12/1959 | Muszynski ........... | 43/3 |
| 3,079,719 A * | 3/1963 | Muszynski ........... | 43/3 |
| 3,939,591 A * | 2/1976 | Schwartztrauber ....... | 43/3 |
| 4,056,890 A * | 11/1977 | Dembski ............ | 43/3 |
| 4,340,192 A * | 7/1982 | Burris, III ........... | 242/377 |
| 5,367,813 A * | 11/1994 | Cherry .............. | 43/2 |
| 6,487,811 B2 * | 12/2002 | Barrett .............. | 43/3 |
| 7,117,628 B1 * | 10/2006 | Bailey ............... | 43/3 |
| 2004/0163300 A1 * | 8/2004 | Pinkston ............ | 43/3 |
| 2008/0155879 A1 * | 7/2008 | Whipple et al. ....... | 43/3 |

* cited by examiner

*Primary Examiner* — Christopher P Ellis

(57) ABSTRACT

Generally, a decoy duck apparatus of the invention includes a decoy duck body which includes an interior cavity which receives anchor retrieval means. A quantity of tether is wound on a spool portion of the anchor retrieval means, and an anchor is attached to a distal end of the tether. With a first embodiment of the invention, the anchor retrieval means include a spring-powered anchor retrieval mechanism. Preferably, a bottom chamber is located in the decoy duck body below the interior cavity. The bottom chamber is defined by an interior cavity bottom wall and a decoy body bottom wall. A removable and replaceable drain plug located in the decoy body bottom wall for permitting drainage of water out from the bottom chamber. Preferably, a resilient tether guide is interconnected between the interior cavity bottom wall and the decoy body bottom wall. The resilient tether guide receives the tether and wipes water off of the tether when the tether is raised and lowered with respect to the decoy duck body. With a second embodiment of the invention, the anchor retrieval means include a hand-cranked anchor retrieval mechanism.

10 Claims, 3 Drawing Sheets

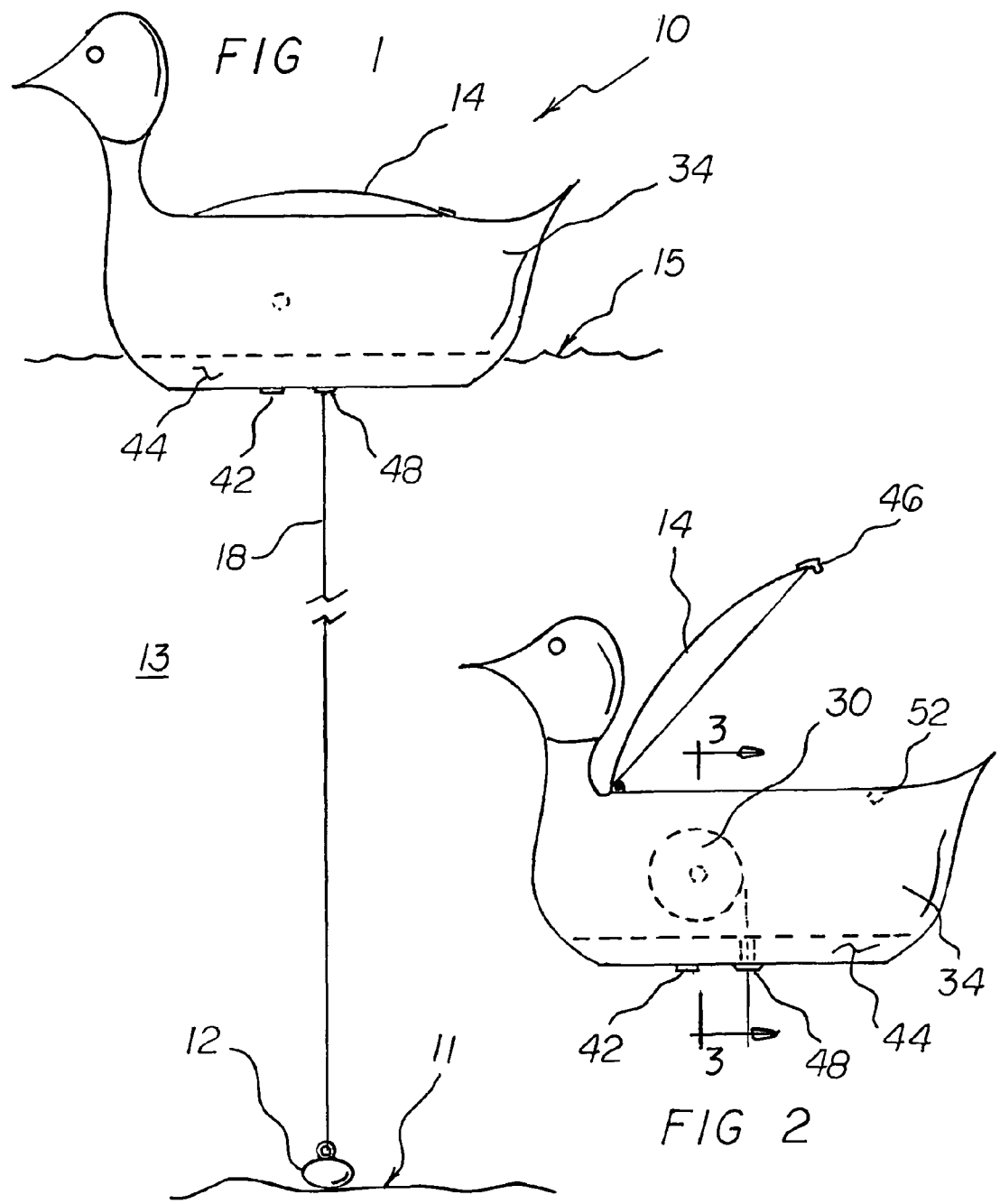

us 8,584,395 B2

DECOY DUCK APPARATUS

CROSS-REFERENCE TO RELATED APPLICATION

This application claims priority under 35 USC §119 of my copending Provisional Application Ser. No. 61/455,306, filed Oct. 19, 2010.

BACKGROUND OF THE INVENTION

1. Field of the Invention

The present invention relates generally to decoy duck apparatuses, and, more particularly, to decoy duck apparatuses especially adapted for lowering and raising a tethered anchor into the water in which the decoy duck apparatus is deployed.

2. Description of the Prior Art

Decoy ducks are well known in the art. In this respect, throughout the years, a number of innovations have been developed relating to decoy duck apparatuses which include a tethered anchor which can be lowered into the water in which the decoy duck apparatus is deployed. The following U.S. patents are representative of some of those innovations: U.S. Pat. Nos. 5,367,813, 5,941,008, 6,487,811, and 6,760,993.

In U.S. Pat. No. 5,367,813, the anchor lowering and raising mechanism is housed in a bottom keel which is immersed in the water. Therefore, there is risk of the mechanism being water logged and subject to water immersion deterioration. In this respect, it would be desirable if a decoy duck apparatus were provided which contained an above-waterline mechanism for lowering and raising an anchor when the decoy duck apparatus is deployed in the water. Also, in U.S. Pat. No. 5,367,813, it is noted that access to the interior of the portion of the body of the decoy duck apparatus that is above the water line is from the side of the side of the decoy duck apparatus. For convenience, it would be desirable if a decoy duck apparatus were provided which allows access to the interior of the decoy duck apparatus from above the apparatus.

In U.S. Pat. No. 5,941,008, the mechanism for lowering and raising an anchor is located below the water line. The same risk of being water logged and deteriorated exists with this patented apparatus.

In U.S. Pat. No. 6,487,811, a keel is provided which hangs down from the bottom of the body of the decoy duck apparatus. The mechanism for raising and lowering a tethered anchor has a line reception port on the front side of the body of the decoy duck apparatus. In this respect, the line is oriented horizontally from the tether spool to the front side of the body of the decoy duck apparatus. As a result, the line has to make a ninety degree turn to hang vertically from the decoy duck apparatus. Also, with line emerging from the front of the decoy duck apparatus, there will be a tendency for the decoy duck apparatus to tilt forward. Rather than have a line paying out from a horizontal to a vertical direction from the front of the decoy duck apparatus, it would be desirable if the line that is payed out from the decoy duck apparatus proceeds entirely in a vertical direction from the bottom of the apparatus.

As with some patents described above, in U.S. Pat. No. 6,760,993, all of the anchor lowering and raising mechanism is located below the waterline. Moreover, all of that mechanism is attached to the keel of a conventional decoy duck apparatus for retrofitting.

Still other features would be desirable in a decoy duck apparatus. With a decoy duck apparatus wherein a line is payed out vertically from below the waterline, it would be desirable is means were provided to remove most of the surface water from a wet line when the line is reeled back into the decoy duck apparatus so as to protect the reeling out and in mechanism from water damage.

In addition, for further protecting the line reeling mechanism from water damage when a wet line is reeled in, it would be desirable if the line reeling mechanism were protected by a separate water-retention chamber located between the line reeling mechanism and the bottom of the decoy duck apparatus that is below the waterline. The separate water-retention chamber further protects the line-reeling mechanism from water damage.

Thus, while the foregoing body of prior art indicates it to be well known to use decoy duck apparatuses that have reels for line to raise and lower anchors, the prior art described above does not teach or suggest a decoy duck apparatus which has the following combination of desirable features: (1) contains a mechanism for lowering and raising an anchor above the water line when the decoy duck apparatus is deployed in the water; (2) allows access to the interior of the decoy duck apparatus from above the apparatus; (3) pays out line from the decoy duck apparatus in an entirely vertical direction from the bottom of the apparatus; (4) has means to remove most of the surface water on a wet line when the line is reeled back into the decoy duck apparatus; and (5) protects the line reeling mechanism with a separate water-retention chamber located between the line reeling mechanism and the bottom of the decoy duck apparatus that is below the waterline.

The foregoing desired characteristics are provided by the unique decoy duck apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a decoy duck apparatus which includes a decoy duck body which includes an interior cavity. Anchor retrieval means are housed within the interior cavity. A quantity of a tether is wound on a portion of the anchor retrieval means, and an anchor is attached to a distal end of the tether.

With a first embodiment of the invention, the anchor retrieval means include a spring-powered anchor retrieval mechanism. Preferably, the spring-powered anchor retrieval mechanism includes a storage spool axle which extends across the interior cavity and which is connected at two ends to inside walls of the decoy duck body. A tether storage spool includes a quantity of wound up tether, and the tether storage spool is supported by the storage spool axle. A retraction spring is retained inside the spring-powered anchor retrieval mechanism. A rotatable ratchet gear is connected to one end of the storage spool axle. The rotatable ratchet gear includes ratchet gear teeth. A spring-biased ratchet gear locking arm is mounted on an inside wall of the decoy duck body adjacent to the rotatable ratchet gear. The spring-biased ratchet gear locking arm includes a locking tooth for engagement with the ratchet gear teeth.

Preferably, an access cover is connected to a top portion of the decoy duck body for allowing access to the interior cavity. A cover-mounted catch portion is connected to a portion of the access cover, and a body-mounted catch receiver is connected to the decoy duck body. The cover-mounted catch portion is selectively connected to the body-mounted catch receiver to lock the access cover with respect to the decoy duck body.

Preferably, a bottom chamber is located in the decoy duck body below the interior cavity. The bottom chamber is defined by an interior cavity bottom wall and a decoy body bottom wall. A removable and replaceable drain plug is located in the decoy body bottom wall for permitting drainage of water out from the bottom chamber.

Preferably, a resilient tether guide is interconnected between the interior cavity bottom wall and the decoy body bottom wall. The resilient tether guide receives the tether and wipes water off of the tether when the tether is raised and lowered with respect to the decoy duck body.

Preferably, a pair of resilient gasket portions are connected to the resilient tether guide for inhibiting water from escaping from the bottom chamber.

With a second embodiment of the invention, the anchor retrieval means include a hand-cranked anchor retrieval mechanism. Preferably, the hand-cranked anchor retrieval mechanism includes a storage spool axle extending across the interior cavity and is connected at two ends to inside walls of the decoy duck body. A tether storage spool which includes a quantity of wound up tether. The tether storage spool is supported by the storage spool axle. An axle-mounted handle-reception portion is connected to one end of the storage spool axle. A handle crank includes a handle-mounted axle-reception portion adapted for connection with the axle-mounted handle-reception portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved decoy duck apparatus which has all of the advantages of the prior art and none of the disadvantages.

It is another object of the present invention to provide a new and improved decoy duck apparatus which may be easily and efficiently manufactured and marketed.

It is a further object of the present invention to provide a new and improved decoy duck apparatus which is of durable and reliable construction.

An even further object of the present invention is to provide a new and improved decoy duck apparatus which is susceptible of a low cost of manufacture with regard to both materials and labor, and which accordingly is then susceptible of low prices of sale to the consuming public, thereby making such decoy duck apparatus available to the buying public.

Still yet a further object of the present invention is to provide a new and improved decoy duck apparatus which contains an above-waterline mechanism for lowering and raising an anchor when the decoy duck apparatus is deployed in the water.

Still another object of the present invention is to provide a new and improved decoy duck apparatus that allows access to the interior of the decoy duck apparatus from above the apparatus.

Yet another object of the present invention is to provide a new and improved decoy duck apparatus which pays out line from the decoy duck apparatus in an entirely vertical direction from the bottom of the apparatus.

Even another object of the present invention is to provide a new and improved decoy duck apparatus that has means to remove most of the surface water on a wet line when the line is reeled back into the decoy duck apparatus.

Still a further object of the present invention is to provide a new and improved decoy duck apparatus which protects the line reeling mechanism with a separate water-retention chamber located between the line reeling mechanism and the bottom of the decoy duck apparatus that is below the waterline.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a first embodiment of the decoy duck apparatus of the invention, with an anchor located in a lowered condition, with a spring-located anchor retrieval mechanism, and with an access cover in a closed condition.

FIG. 2 is a side view of the embodiment of the decoy duck apparatus shown in FIG. 1, with the access cover in an open condition.

DESCRIPTION OF THE PREFERRED EMBODIMENTS

Figure 3:
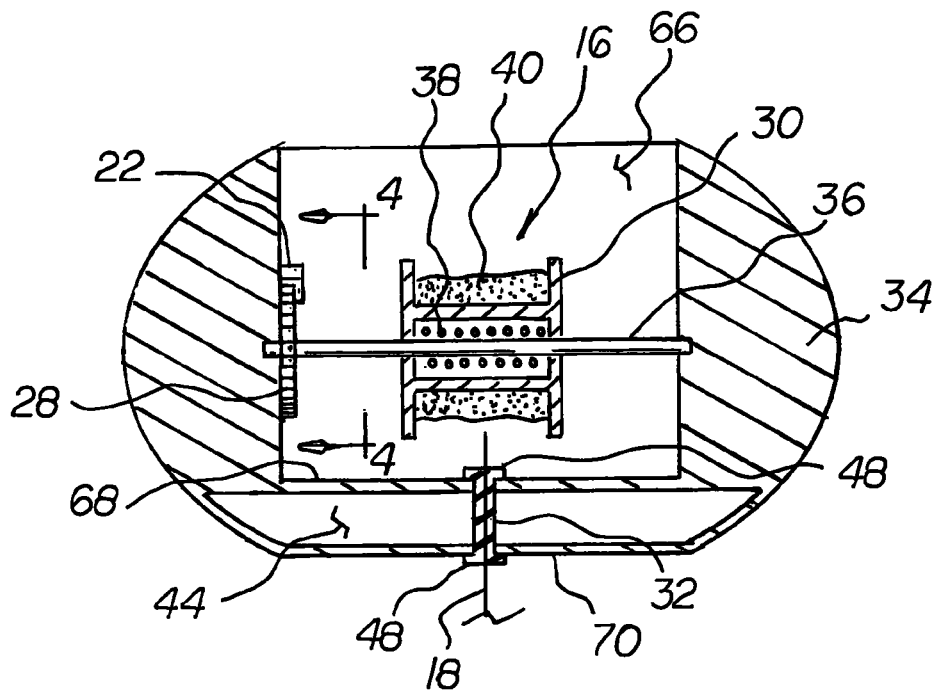
FIG. 3 is an enlarged cross-sectional view of the embodiment of the decoy duck apparatus of FIG. 2 taken along line 3-3 thereof.
Figure 4:
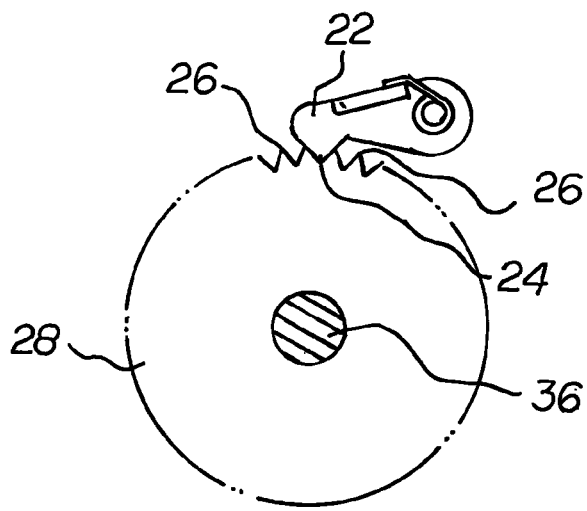
FIG. 4 is an enlarged top view of the embodiment of the invention shown in FIG. 3, taken along line 4-4 thereof.

With reference to the drawings, a new and improved decoy duck apparatus embodying the principles and concepts of the present invention will be described.

Turning to FIGS. 1-4, there is shown a first embodiment of the decoy duck apparatus of the invention generally designated by reference numeral 10. In each of the figures, reference numerals are shown that correspond to like reference numerals that designate like elements shown in other figures.

Generally, a decoy duck apparatus 10 of the invention includes a decoy duck body 34 which includes an interior cavity 66. Anchor retrieval means are housed within the interior cavity 66. A quantity of tether 40, such that a thin tether 18, is wound on a portion of the anchor retrieval means, and an anchor 12 is attached to a distal end of the tether 18.

With the first embodiment of the invention, the anchor retrieval means include a spring-powered anchor retrieval mechanism 16. Preferably, the spring-powered anchor retrieval mechanism 16 includes a storage spool axle 36 which extends across the interior cavity 66 and which is connected at two ends to inside walls of the decoy duck body 34. A tether storage spool 30 includes a quantity of wound up tether 40, and the tether storage spool 30 is supported by the storage spool axle 36. A retraction spring 38 is retained inside the spring-powered anchor retrieval mechanism 16. A rotatable ratchet gear 28 is connected to one end of the storage spool axle 36. The rotatable ratchet gear 28 includes ratchet gear teeth 26. A spring-biased ratchet gear locking arm 22 is mounted on an inside wall of the decoy duck body 34 adjacent to the rotatable ratchet gear 28. The spring-biased ratchet gear locking arm 22 includes a locking tooth 24 ratchet gear teeth 26 for engagement with the ratchet gear teeth 26.

Preferably, an access cover 14 is connected to a top portion of the decoy duck body 34 for allowing access to the interior cavity 66. A cover-mounted catch portion 46 is connected to a portion of the access cover 14, and a body-mounted catch receiver 52 is connected to the decoy duck body 34. The cover-mounted catch portion 46 is selectively connected to the body-mounted catch receiver 52 to lock the access cover 14 with respect to the decoy duck body 34.

Preferably, a bottom chamber 44 is located in the decoy duck body 34 below the interior cavity 66. The bottom chamber 44 is defined by an interior cavity bottom wall 68 and a decoy body bottom wall 70. A removable and replaceable drain plug 42 located in the decoy body bottom wall 70 for permitting drainage of water out from the bottom chamber 44.

Preferably, a resilient tether guide 32 is interconnected between the interior cavity bottom wall 68 and the decoy body bottom wall 70. The resilient tether guide 32 receives the tether 18 and wipes water off of the tether 18 when the tether 18 is raised and lowered with respect to the decoy duck body 34.

Preferably, a pair of resilient gasket portions 48 is connected to the resilient tether guide 32 for inhibiting water from escaping from the bottom chamber 44.

In operation of the first embodiment of the invention 10, with reference to FIGS. 1-4, the decoy duck apparatus 10 is placed on the water surface 15, and the anchor 12 is dropped from the decoy duck apparatus 10. As the anchor 12 falls through the body of water 13, the tether 18 is unwound from the tether storage spool 30, the retraction spring 38 is wound up, the rotatable ratchet gear 28 turns, and the locking tooth 24 rides over the ratchet gear teeth 26 that it contacts as the rotatable ratchet gear 28 turns. When the anchor 12 reaches the floor of the body of water 11, the locking tooth 24 locks up with an adjacent ratchet gear tooth 26, which prevents the wound up retraction spring 38 from pulling up on the payed out tether 18.

When the anchor 12 reaches the floor of the body of water 11, the anchor 12 and the payed out tether 18 serve to keep the decoy duck apparatus 10 in a substantially fixed position on the water surface 15.

Once it is desired to raise up the anchor 12 and move the location of the decoy duck apparatus 10, a user unlatches the cover-mounted catch portion 46 from the body-mounted catch receiver 52 and lifts the access cover 14, as shown in FIG. 2. Then, the user lifts the spring-biased ratchet gear locking arm 22 off of the locked ratchet gear tooth 26. When this occurs, the wound up retraction spring 38 serves to rewind the unwound tether 18 onto the tether storage spool 30. As the tether 18 is rewound onto the tether storage spool 30, the anchor 12 is lifted up and is retracted toward the decoy duck body 34.

In addition, when the tether 18 is wound up on the tether storage spool 30, the tether 18 passes through the resilient tether guide 32 causing water to be wiped off of the tether 18 and partially to be retained in the bottom chamber 44. The top and bottom resilient gasket portions 48 keep the wiped off water inside the bottom chamber 44, thereby protecting the anchor retrieval means from being exposed to the vast majority of water that is wiped off of the tether 18.

When the decoy duck apparatus 10 is removed from the body of water 13, the removable and replaceable drain plug 42 can be removed from the bottom of the decoy duck body 34, and water inside the bottom chamber 44 can drain out from the bottom chamber 44. Then, the removable and replaceable drain plug 42 is replaced into the decoy body bottom wall 70.

Turning to a second embodiment of the invention 50, the anchor retrieval means include a hand-cranked anchor retrieval mechanism 56. The hand-cranked anchor retrieval mechanism 56 includes a storage spool axle 36 extending across the interior cavity 66 and is connected at two ends to inside walls of the decoy duck body 34. A tether storage spool 30 which includes a quantity of wound up tether 40. The tether storage spool 30 is supported by the storage spool axle 36. An axle-mounted handle-reception portion 58 is connected to one end of the storage spool axle 36. A handle crank 60 includes a handle-mounted axle-reception portion 62 adapted for connection with the axle-mounted handle-reception portion 58.

Figure 5:
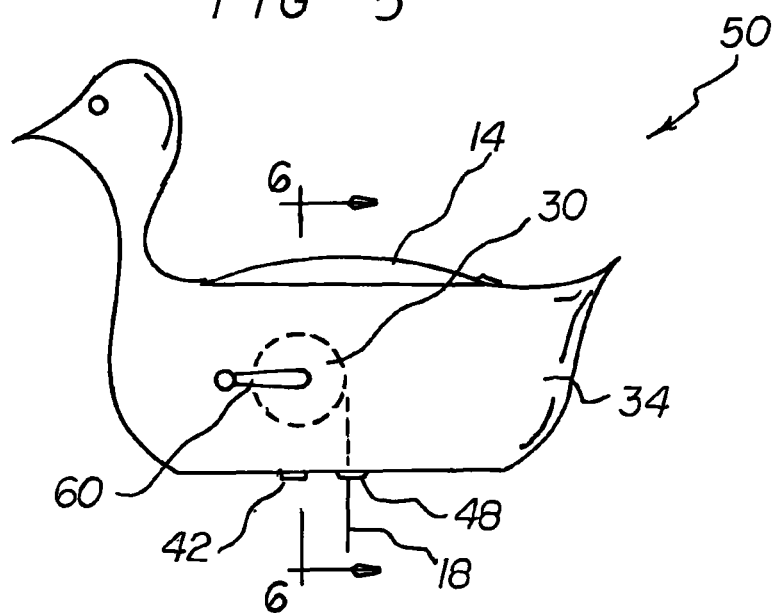
FIG. 5 is a side view of a second embodiment of the invention shown which includes a hand-cranked anchor retrieval mechanism.
Figure 6:
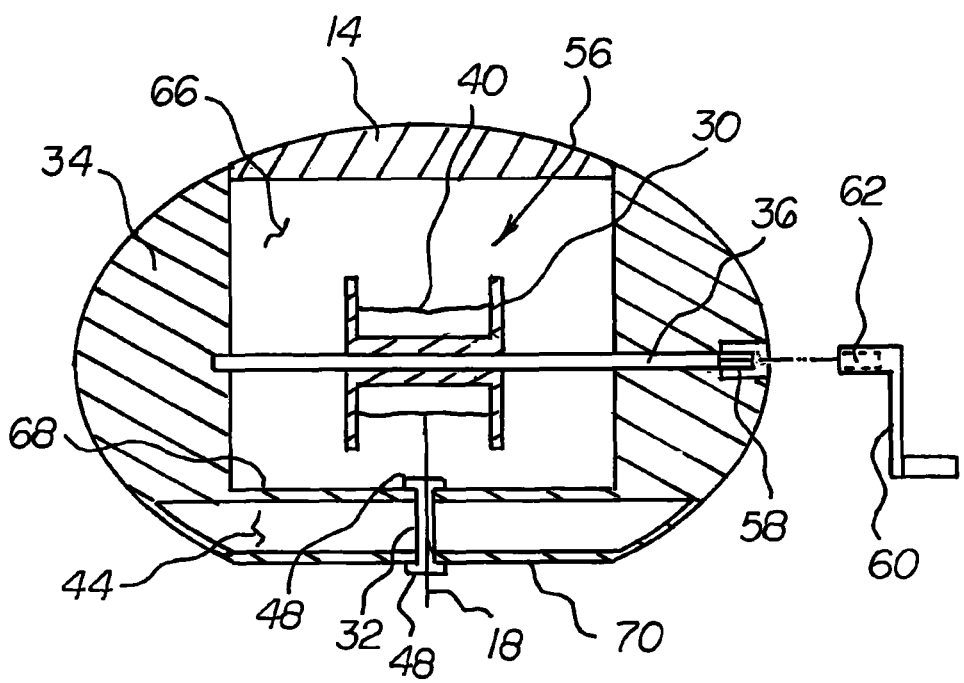
FIG. 6 is an enlarged cross-sectional view of the embodiment of the decoy duck apparatus shown in FIG. 5, taken along line 6-6 thereof.

In operation of the second embodiment of the invention 50, with reference to FIGS. 1, 5, and 6, the decoy duck apparatus 50 is placed on the water surface 15 and the anchor 12 is dropped from the decoy duck apparatus 10. As the anchor 12 falls through the body of water 13, the tether 18 is unwound from the tether storage spool 30. When the anchor 12 reaches the floor of the body of water 11, the anchor 12 and the payed out tether 18 serve to keep the decoy duck apparatus 50 in a substantially fixed position on the water surface 15.

Once it is desired to raise up the anchor 12 and move the location of the decoy duck apparatus 50, a user attaches a handle-mounted axle-reception portion 62 of the handle crank 60 to the axle-mounted handle-reception portion 58 of the storage spool axle 36. Then, the user turns the handle crank 60 to wind up the tether 18 on the tether storage spool 30, thereby lifting the anchor 12 toward the decoy duck body 34.

In addition, when the tether 18 is wound up on the tether storage spool 30, the tether 18 passes through the resilient tether guide 32 causing water to be wiped off of the tether 18 and partially to be retained in the bottom chamber 44. The top and bottom resilient gasket portions 48 keep the wiped off water inside the bottom chamber 44, thereby protecting the anchor retrieval means from the vast majority of water that is wiped off of the tether 18. When the decoy duck apparatus 10 is removed from the body of water 13, the removable and replaceable drain plug 42 can be removed from the bottom of the decoy duck body 34, and water inside the bottom chamber 44 can drain out from the bottom chamber 44. Then, the removable and replaceable drain plug 42 is replaced into the decoy body bottom wall 70.

The components of the decoy duck apparatus of the invention can be made from inexpensive and durable metal, plastic, and rubber materials.

The foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described above may be resorted to in carrying out the present invention.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved decoy duck apparatus that is low in cost, relatively simple in design and operation, and which may advantageously be used to provide an above-waterline mechanism for lowering and raising an anchor when the decoy duck apparatus is deployed in the water. With the invention, a decoy duck apparatus is provided which allows access to the interior of the decoy duck apparatus from above the apparatus. With the invention, a decoy duck apparatus is provided which pays out line from the decoy duck apparatus in an entirely vertical direction from the bottom of the apparatus. With the invention, a decoy duck apparatus is provided which has means to remove most of the surface water on a wet line when the line is reeled back into the decoy duck apparatus. With the invention, a decoy duck apparatus is provided which protects the line reeling mechanism with a separate water-retention chamber located between the line reeling mechanism and the bottom of the decoy duck apparatus that is below the waterline.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A decoy duck apparatus, comprising:
    a decoy duck body which includes an interior cavity,
    anchor retrieval means housed within said interior cavity,
    a quantity of tether such that a tether is wound on a portion of said anchor retrieval means,
    a bottom chamber located in said decoy duck body below said interior cavity, wherein said bottom chamber is defined by an interior cavity bottom wall and a decoy body bottom wall, and
    an anchor attached to a distal end of said tether.

2. The apparatus of claim 1, further including:
    a removable and replaceable drain plug located in said decoy body bottom wall for permitting drainage of water out from said bottom chamber.

3. The apparatus of claim 1, further including:
    a resilient tether guide interconnected between said interior cavity bottom wall and said decoy body bottom wall, wherein said resilient tether guide receives said tether and wipes water off of said tether when said tether is raised and lowered with respect to said decoy duck body.

4. The apparatus of claim 3, further including:
    a pair of resilient gasket portions connected to said resilient tether guide for inhibiting water from escaping from said resilient tether guide to said bottom chamber.

5. The apparatus of claim 1 wherein said anchor retrieval means include a spring-powered anchor retrieval mechanism.

6. The apparatus of claim 5 wherein said spring-powered anchor retrieval mechanism includes:
    a storage spool axle extending across said interior cavity and connected at two ends to inside walls of said decoy duck body,
    a tether storage spool which includes a quantity of wound up tether, wherein said tether storage spool is supported by said storage spool axle,
    a retraction spring retained inside said spring-powered anchor retrieval mechanism,
    a rotatable ratchet gear connected to one end of said storage spool axle, wherein said rotatable ratchet gear includes ratchet gear teeth, and
    a spring-biased ratchet gear locking arm mounted on an inside wall of said decoy duck body adjacent to said rotatable ratchet gear, wherein said spring-biased ratchet gear locking arm includes a locking tooth ratchet gear teeth for engagement with said ratchet gear teeth.

7. The apparatus of claim 1, further including:
    an access cover connected to a top portion of said decoy duck body for allowing access to said interior cavity.

8. The apparatus of claim 7, further including:
    a cover-mounted catch portion connected to a portion of said access cover, and
    a body-mounted catch receiver connected to said decoy duck body,
    wherein said cover-mounted catch portion is selectively connected to said body-mounted catch receiver to lock said access cover with respect to said decoy duck body.

9. The apparatus of claim 1 wherein said anchor retrieval means include a hand-cranked anchor retrieval mechanism.

10. The apparatus of claim 9 wherein said hand-cranked anchor retrieval mechanism includes:
    a storage spool axle extending across said interior cavity and connected at two ends to inside walls of said decoy duck body,
    a tether storage spool which includes a quantity of wound up tether, wherein said tether storage spool is supported by said storage spool axle,
    an axle-mounted handle-reception portion connected to one end of said storage spool axle, and
    a handle crank which includes a handle-mounted axle-reception portion adapted for connection with said axle-mounted handle-reception portion.

* * * * *